US011392563B2

(12) United States Patent
Airmet et al.

(10) Patent No.: US 11,392,563 B2
(45) Date of Patent: Jul. 19, 2022

(54) EFFICIENT COMPRESSION OF WORKFLOW STATE REPRESENTATIONS

(71) Applicant: ServiceNow, Inc., Santa Clara, CA (US)

(72) Inventors: David Elliot Airmet, San Diego, CA (US); Pierce Edward Courtney, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 769 days.

(21) Appl. No.: 16/248,606

(22) Filed: Jan. 15, 2019

(65) Prior Publication Data

US 2020/0226108 A1 Jul. 16, 2020

(51) Int. Cl.
*G06F 16/215* (2019.01)
*G06F 16/958* (2019.01)
*G06F 16/23* (2019.01)
*G06F 40/279* (2020.01)

(52) U.S. Cl.
CPC ........ *G06F 16/215* (2019.01); *G06F 16/2379* (2019.01); *G06F 16/986* (2019.01); *G06F 40/279* (2020.01)

(58) Field of Classification Search
None
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |

(Continued)

OTHER PUBLICATIONS

N. Bhatti & W. Hassan, Object Serialization and Deserialization Using XML, Tata McGraw-Hill Publishing Company (Year: 2000).*

(Continued)

*Primary Examiner* — Thu Nguyet T Le
(74) *Attorney, Agent, or Firm* — Fletcher Yoder P.C.

(57) ABSTRACT

A computing system may include a computing device, within a computational instance that is associated with a managed network, and a proxy server application disposed within the managed network, where the computing device is configured to: obtain a first reference to an element of a de-serialized state representation of a workflow; determine that the element contains a text string greater than a pre-determined threshold length; write a first compound object to a file, where the first compound object contains the text string and a key that uniquely identifies the text string; associate the key with the text string in a map; obtain a second reference to the element; determine that the text string contained by the element is associated with the key in the map; and write a second compound object to the file, where the second compound object contains the key but does not contain the text string.

20 Claims, 13 Drawing Sheets

(56) References Cited

U.S. PATENT DOCUMENTS

| | | |
|---|---|---|
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,025,702 B1* | 7/2018 | Karppanen ......... G06F 12/0868 |
| 2008/0235260 A1* | 9/2008 | Han ................. G06F 40/151 |

OTHER PUBLICATIONS

Jackson Annotation Examples, Jul. 21, 2018, downloaded from https://www.baeldung.com/jackson-annotations on Dec. 13, 2018.

Jackson—Quick Guide, downloaded from https://www.tutorialspoint.com/jackson/jackson_quick_guide.htm on Dec. 13, 2018.

Do Jackson with JSON, downloaded from https://www.baeldung.com/, Dec. 13, 2018.

* cited by examiner

```
"outputs":{
    "producerOutput":{
        "@class":"com.example.process_flow.val.OutVal",
        "@id":"803fc98a-a7ba-4bee-9740-647015936d19", "value":"testValue1testValue1testValue1testValue1testValue1testValue1testValue1testValue1testValue1t
estValue1testValue1testValue1testValue1testValue1testValue1testValue1testValue1testValue1testValue1
testValue1testValue1testValue1testValue1testValue1testValue1testValue1testValue1testValue1testValue
1testValue1", "displayValue":"testValue1testValue1testValue1testValue1testValue1testValue1testValue1testValue1test
Value1testValue1testValue1testValue1testValue1testValue1testValue1testValue1testValue1testValue1tes
tValue1testValue1testValue1testValue1testValue1testValue1testValue1testValue1testValue1testValue1te
stValue1testValue1" }
    }

. . .

"inputs":{
    "consumerInput":{
        "@class":"InVal",
        "@id":"378b2702-b27b-4384-a760-b03343bfd344", "value":"testValue1testValue1testValue1testValue1testValue1testValue1testValue1testValue1testValue1t
estValue1testValue1testValue1testValue1testValue1testValue1testValue1testValue1testValue1testValue1
testValue1testValue1testValue1testValue1testValue1testValue1testValue1testValue1testValue1testValue
1testValue1", "displayValue":"testValue1testValue1testValue1testValue1testValue1testValue1testValue1testValue1test
Value1testValue1testValue1testValue1testValue1testValue1testValue1testValue1testValue1testValue1tes
tValue1testValue1testValue1testValue1testValue1testValue1testValue1testValue1testValue1testValue1te
stValue1testValue1" }
    }

. . .

"consumerInput":{
        "@class":"InVal",
        "@id":"68f86be9-d1a2-4f2f-b74f-1e717bd06613", "value":"testValue1testValue1testValue1testValue1testValue1testValue1testValue1testValue1testValue1t
estValue1testValue1testValue1testValue1testValue1testValue1testValue1testValue1testValue1testValue1
testValue1testValue1testValue1testValue1testValue1testValue1testValue1testValue1testValue1testValue
1testValue1", "displayValue":"testValue1testValue1testValue1testValue1testValue1testValue1testValue1testValue1test
Value1testValue1testValue1testValue1testValue1testValue1testValue1testValue1testValue1testValue1tes
tValue1testValue1testValue1testValue1testValue1testValue1testValue1testValue1testValue1testValue1te
stValue1testValue1" }
    }
```

```
"outputs":{
        "producerOutput":{
          "@class":"com.example.process_flow.val.OutVal",
          "@id":"4ccca69b-0f7b-43cc-bc42-4a584ffba4c5",
          "hasValue":true,
          "value":{
            "@class":"com.example.process_flow.engine.serialization.ValueProxy",
```
← 710
```
"val":"testValue1testValue1testValue1testValue1testValue1testValue1testValue1testValue1testValue1test
Value1testValue1testValue1testValue1testValue1testValue1testValue1testValue1testValue1testValue1tes
tValue1testValue1testValue1testValue1testValue1testValue1testValue1testValue1testValue1testValue1te
stValue1",
            "key":"ff69712d-c60d-47d6-a2f1-79ce0c47f99d"
          },
          "displayValue":{
```
← 712
```
            "@class":"com.example.process_flow.engine.serialization.ValueProxy",
            "val":null,
            "key":"ff69712d-c60d-47d6-a2f1-79ce0c47f99d"
          }
        }
      }

...

"inputs":{
        "consumerInput":{
          "@class":"InVal",
          "@id":"b9e0b1b8-475d-4e64-a62a-bef52d64ff6a",
          "hasValue":true,
          "template":"",
          "inputUsed":false,
          "references":[
           {
             "@class":"com.example.process_flow.val.OutVal",
             "@id":"a715b30c-6a53-4332-bb65-f67814872a25",
             "hasValue":true,
             "value":{
```
← 714
```
               "@class":"com.example.process_flow.engine.serialization.ValueProxy",
               "val":null,
               "key":"ff69712d-c60d-47d6-a2f1-79ce0c47f99d"
             },
             "displayValue":{
```
← 716
```
               "@class":"com.example.process_flow.engine.serialization.ValueProxy",
               "val":null,
               "key":"ff69712d-c60d-47d6-a2f1-79ce0c47f99d"
             }
           }
```

FIG. 7B

EFFICIENT COMPRESSION OF WORKFLOW STATE REPRESENTATIONS

BACKGROUND

A workflow implemented on a remote network management platform is an automated or semi-automated procedure (e.g., implemented as one or more software applications) that performs one or more pre-defined tasks. The state of the workflow, which represents a snapshot of the workflow's progress, may be maintained as needed. For example, the workflow may be paused while it either waits for more data to become available or for manual input. At these points, the state may be stored so that it can be used to continue the workflow at a later time.

Additionally, some parts of the workflow may utilize data stored in a computational instance of the remote network management platform, and other parts of the workflow may utilize data stored in a managed network associated with the computational instance. Thus, a representation of the workflow's state may be moved to and from computing devices of the computational instance and the managed network.

SUMMARY

Representing the state of a workflow, either due to the workflow being paused or in order to transfer the state between devices, becomes challenging when the state grows large. As an example, an enterprise may store its human resource records on a computational instance of a remote network management platform. For a large enterprise with detailed records, the total size of this data can easily be several megabytes. Unless care is taken to avoid duplication of this data in the representation of the state, multiple copies of the data may be stored. As a consequence, the representation may grow unmanageably large and unwieldy.

The embodiments herein avoid this duplication by detecting large data objects as they are serialized to a file, and replacing these with compound objects that include the data and a short, unique key. Subsequent instances of identical data objects are represented by compound objects that include the key but not the data. As a result, file size can be reduced by megabytes in many practical examples.

Accordingly, a first example embodiment may involve a computational instance of a remote network management platform, where a computing device is disposed within the computational instance and is associated with a managed network. The first example embodiment may also involve a proxy server application, executable on a server device that is disposed within the managed network. The computing device may be configured to: obtain a first reference to an element of a de-serialized state representation of a workflow, where the workflow was executed at least in part by the computational instance, and where the de-serialized state representation is stored in volatile memory of the computing device; determine that the element contains a text string greater than a pre-determined threshold length; possibly in response to determining that the element contains the text string greater than the pre-determined threshold length, (i) write a first compound object to a structured file, where the first compound object contains the text string and a key that uniquely identifies the text string, and (ii) associate the key with the text string in a map, where the structured file contains a serialized state representation of the workflow and is stored in non-volatile memory of the computing device; obtain a second reference to the element; possibly in response to obtaining the second reference to the element, determine that the text string contained by the element is associated with the key in the map; possibly in response to determining that the text string contained by the element is associated with the key, write a second compound object to the structured file, where the second compound object contains the key but does not contain the text string; and transmit, to the proxy server application, the structured file, where the proxy server application uses the structured file to further execute the workflow.

A second example embodiment may involve obtaining, by a computing device, a first reference to an element of a de-serialized state representation of a workflow, where the workflow was executed at least in part by the computing device, and where the de-serialized state representation is stored in volatile memory of the computing device. The second example embodiment may also involve determining, by the computing device, that the element contains a text string greater than a pre-determined threshold length. The second example embodiment may also involve, possibly in response to determining that the element contains the text string greater than the pre-determined threshold length, the computing device: (i) writing a first compound object to a structured file, where the first compound object contains the text string and a key that uniquely identifies the text string, and (ii) associating the key with the text string in a map, where the structured file contains a serialized state representation of the workflow and is stored in non-volatile memory of the computing device. The second example embodiment may also involve obtaining, by the computing device, a second reference to the element. The second example embodiment may also involve, possibly in response to obtaining the second reference to the element, determining, by the computing device, that the text string contained by the element is associated with the key in the map. The second example embodiment may also involve, possibly in response to determining that the text string contained by the element is associated with the key, writing, by the computing device, a second compound object to the structured file, where the second compound object contains the key but does not contain the text string.

A third example embodiment may involve obtaining, by a computing device, a structured file containing a serialized state representation of a workflow, where the structured file is stored in non-volatile memory of the computing device. The third example embodiment may also involve reading, by the computing device, a first compound object from the structured file, where the first compound object contains a text string and a key that uniquely identifies the text string. The third example embodiment may also involve storing, by the computing device and in volatile memory of the computing device, (i) the text string as an element of a de-serialized state representation of the workflow, (ii) a first reference to the text string, and (iii) a map associating the text string with the key. The third example embodiment may also involve reading, by the computing device, a second compound object from the structured file, where the second compound object contains the key but does not contain the text string. The third example embodiment may also involve, possibly in response to reading the second compound object from the structured file, determining, by the computing device, that the text string is associated with the key in the map. The third example embodiment may also involve, possibly in response to determining that the text string is associated with the key in the map, storing, by the computing device and in volatile memory of the computing device, a second reference to the element.

In a fourth example embodiment, an article of manufacture may include a non-transitory computer-readable medium, having stored thereon program instructions that, upon execution by a computing system, cause the computing system to perform operations in accordance with the first, second, and/or third example embodiment.

In a fifth example embodiment, a computing system may include at least one processor, as well as memory and program instructions. The program instructions may be stored in the memory, and upon execution by the at least one processor, cause the computing system to perform operations in accordance with the first, second, and/or third example embodiment.

In a sixth example embodiment, a system may include various means for carrying out each of the operations of the first, second, and/or third example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A is a representation of workflow state with duplication of data, in accordance with example embodiments.

FIG. 7B is a representation of workflow state without duplication of data, in accordance with example embodiments.

DETAILED DESCRIPTION

Figure 1:
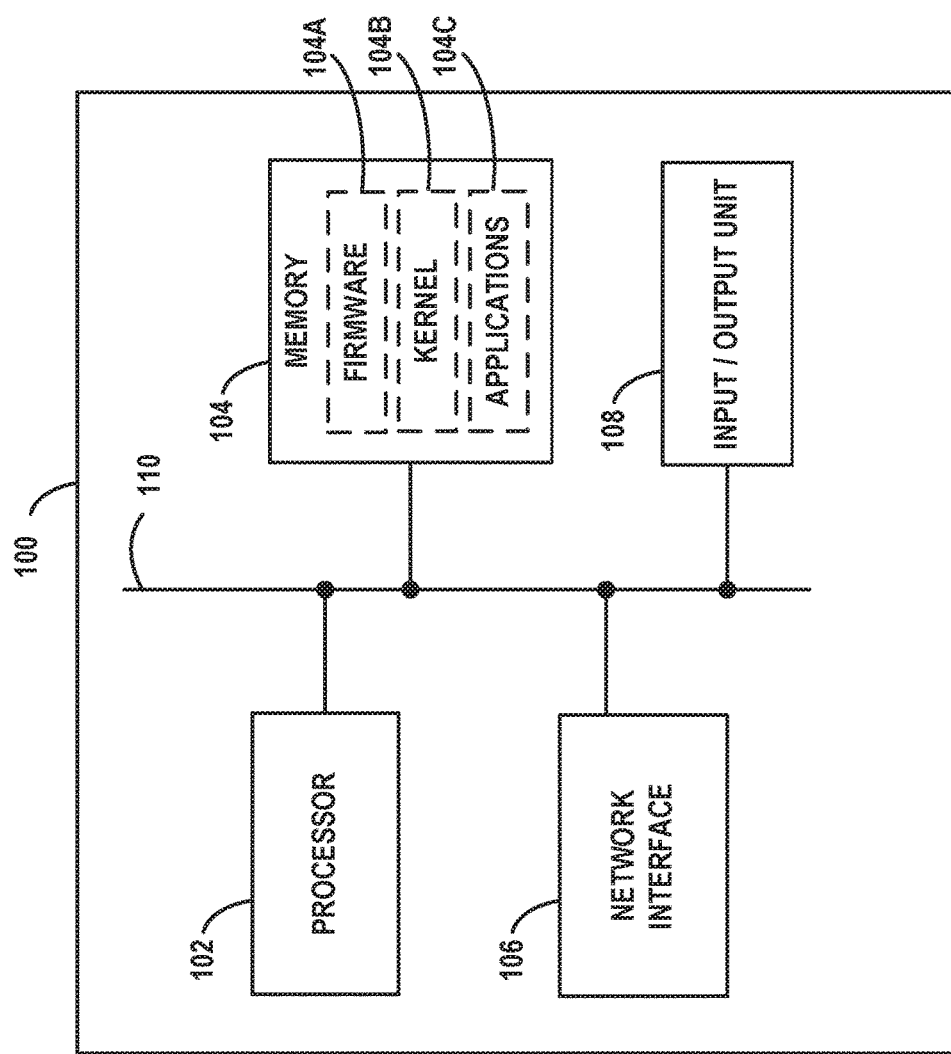
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
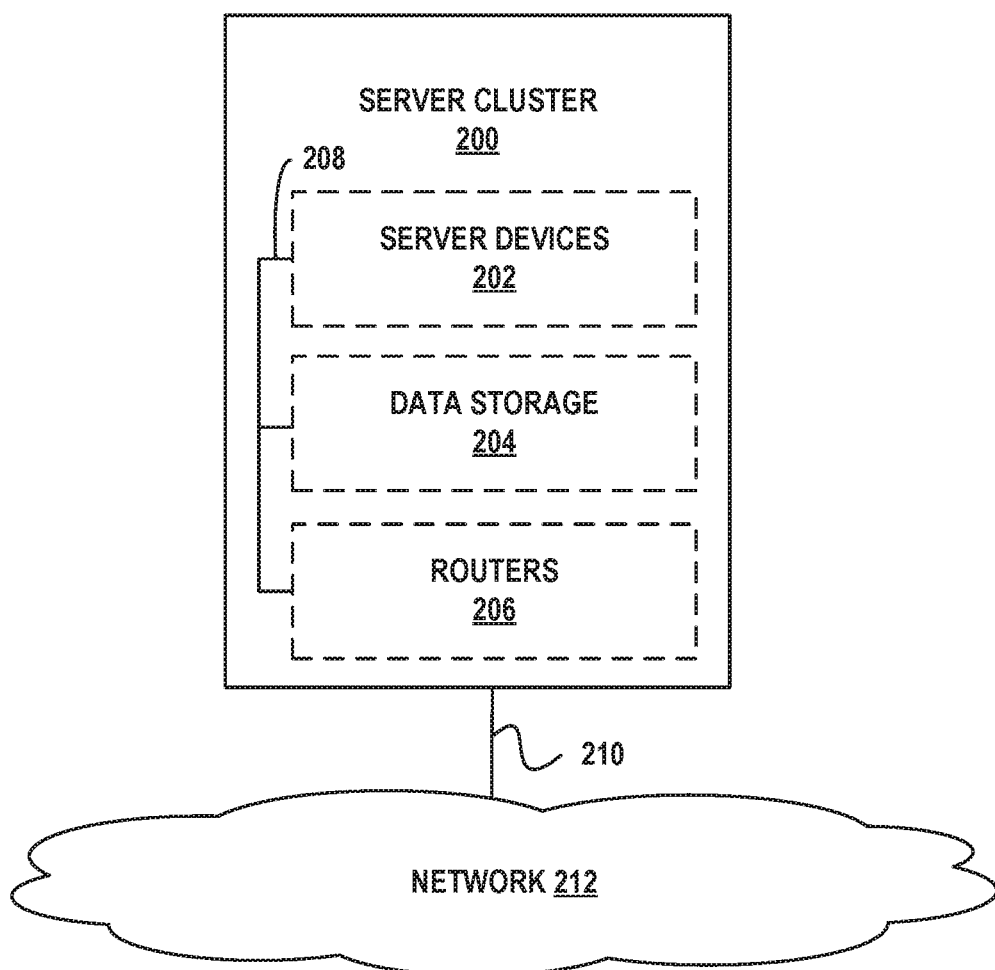
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
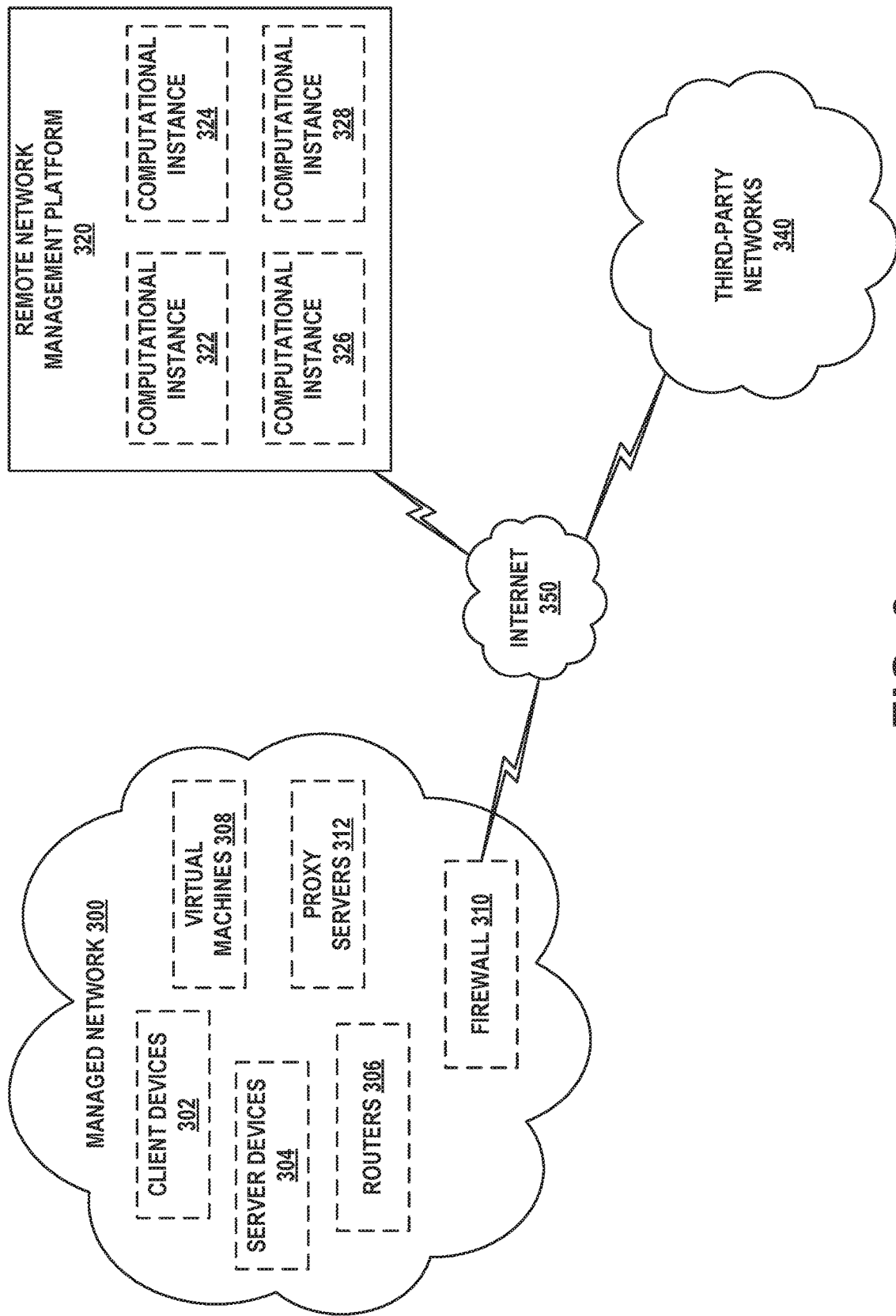
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
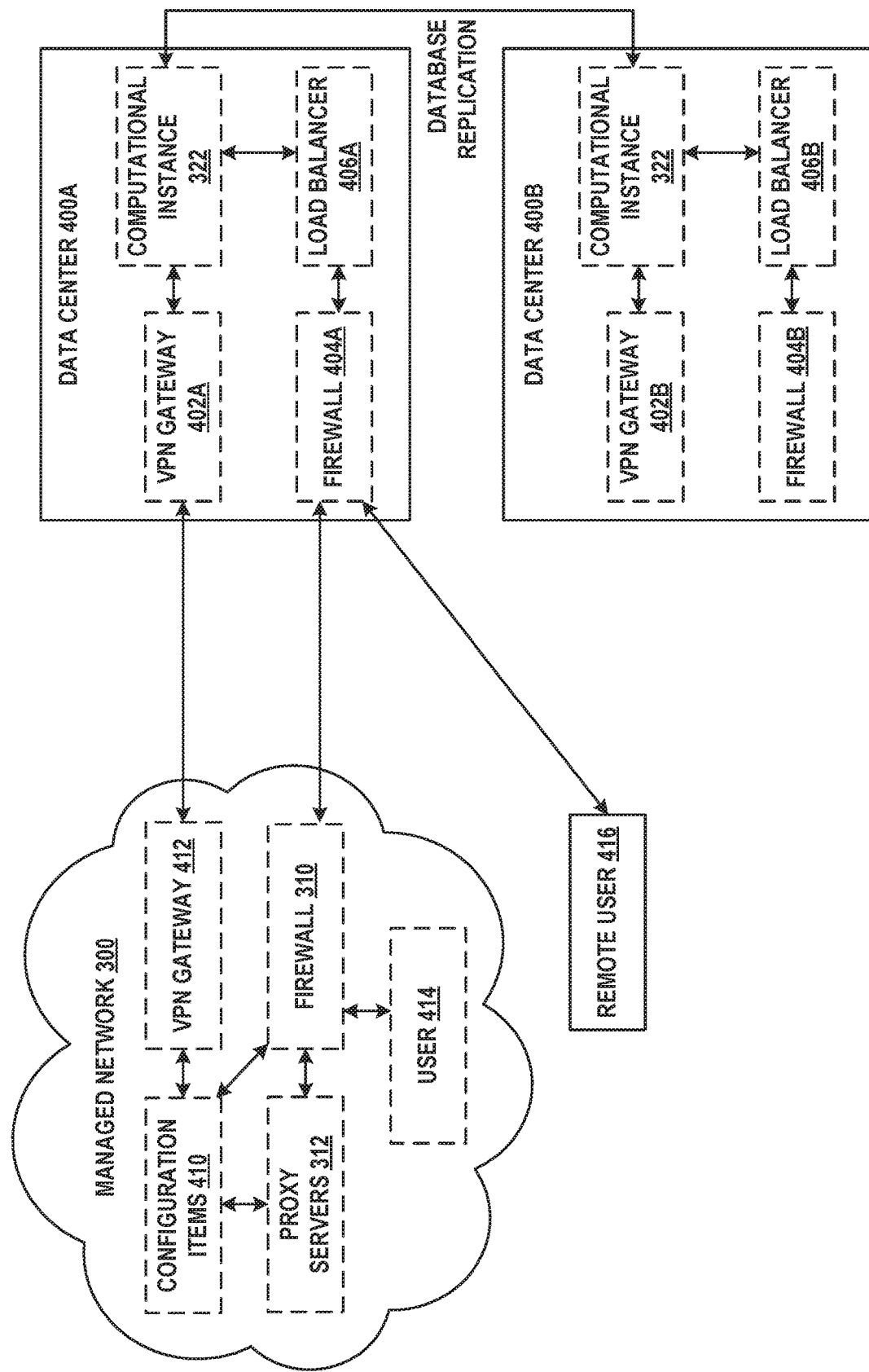
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
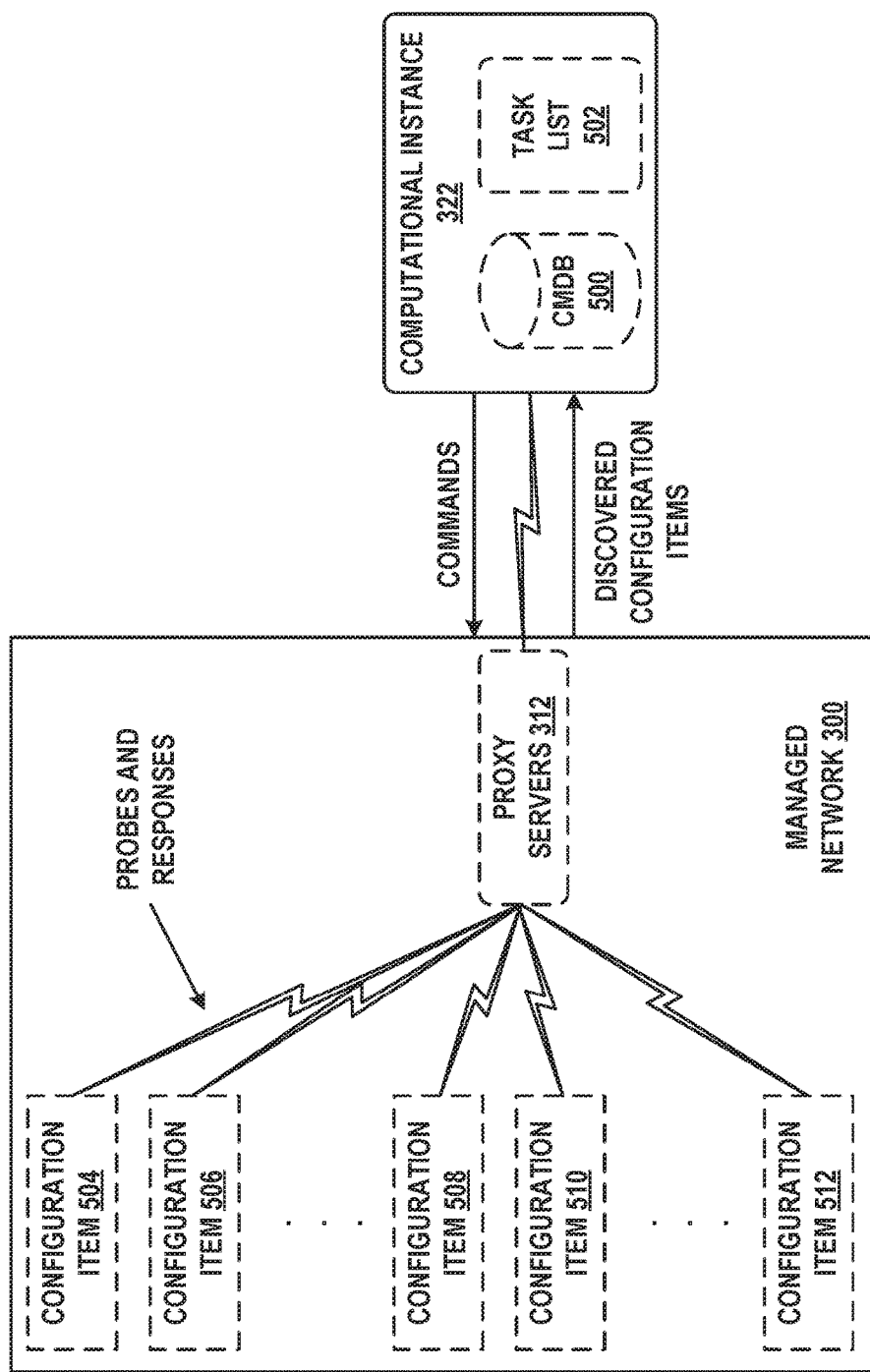
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
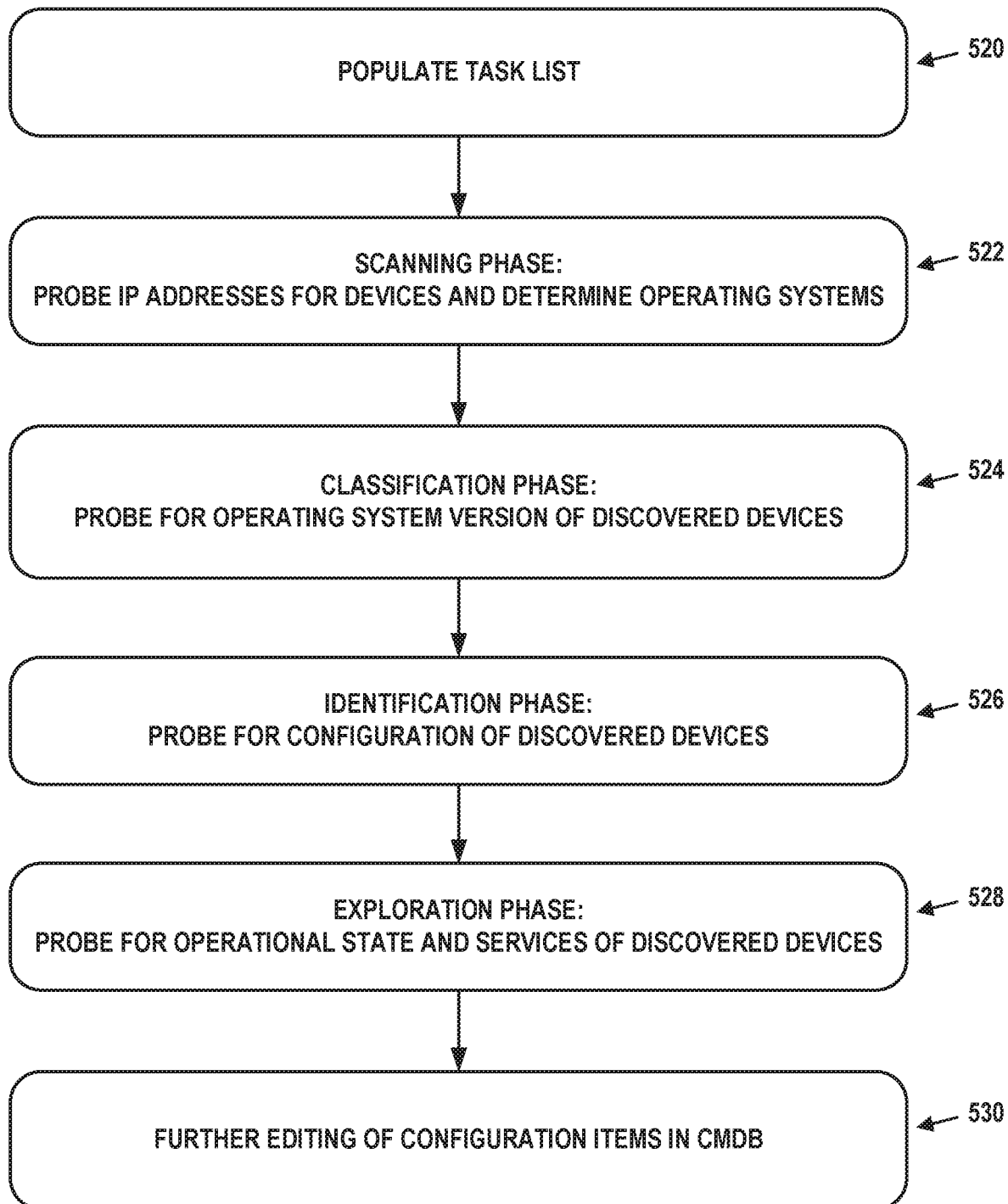
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EFFICIENT WORKFLOW STATE REPRESENTATION

Workflows can be defined by way of a remote network management platform. In short, workflows are programs (often defined by users of the remote network management platform) that carry out a number of tasks to achieve a specific goal. Such a goal might be related to HR, supply chain, IT, or finance operations, to name a few.

As one possible example, a workflow may be defined by users in a managed network to query a database of IT incident reports for any such reports that have been open for more than 90 days, and to give these reports a higher priority so that they are more likely to be rapidly addressed by IT staff. Thus, the workflow may query a database in a computational instance of the remote network management platform that is associated with the managed network. The query may request reports open for more than 90 days. For each such report returned by the database, the workflow may change that report's priority to a pre-determined value by writing this value to the report in the database.

But workflows can be complex and incorporate operations involving computing devices disposed within the computational instance, the managed network, and possibly third-party services as well. As another example, suppose that an enterprise maintains a database of its employees in its computational instance, but also maintains a legacy database of employee reviews in its managed network. In order to conduct annual performance reviews of all employees, a workflow may trigger one of its routines, operational within the computational instance, to execute. This routine may obtain all records of current employees from the database in the computational instance, and save this state in a structured file, e.g., XML or JavaScript Object Notation (JSON). The workflow may then trigger another of its routines, operational on a proxy server within the managed network, to execute. This additional routine may obtain the structured file containing the state from the computational instance, look up the employee reviews in the legacy database, and attach the employee reviews to the corresponding records. The resulting state is once again saved in the structured file. An additional routine of the workflow may obtain the updated state from the proxy server, and email each employee's record (with the review data) to that employee's manager for consideration during the review process.

Figure 6:
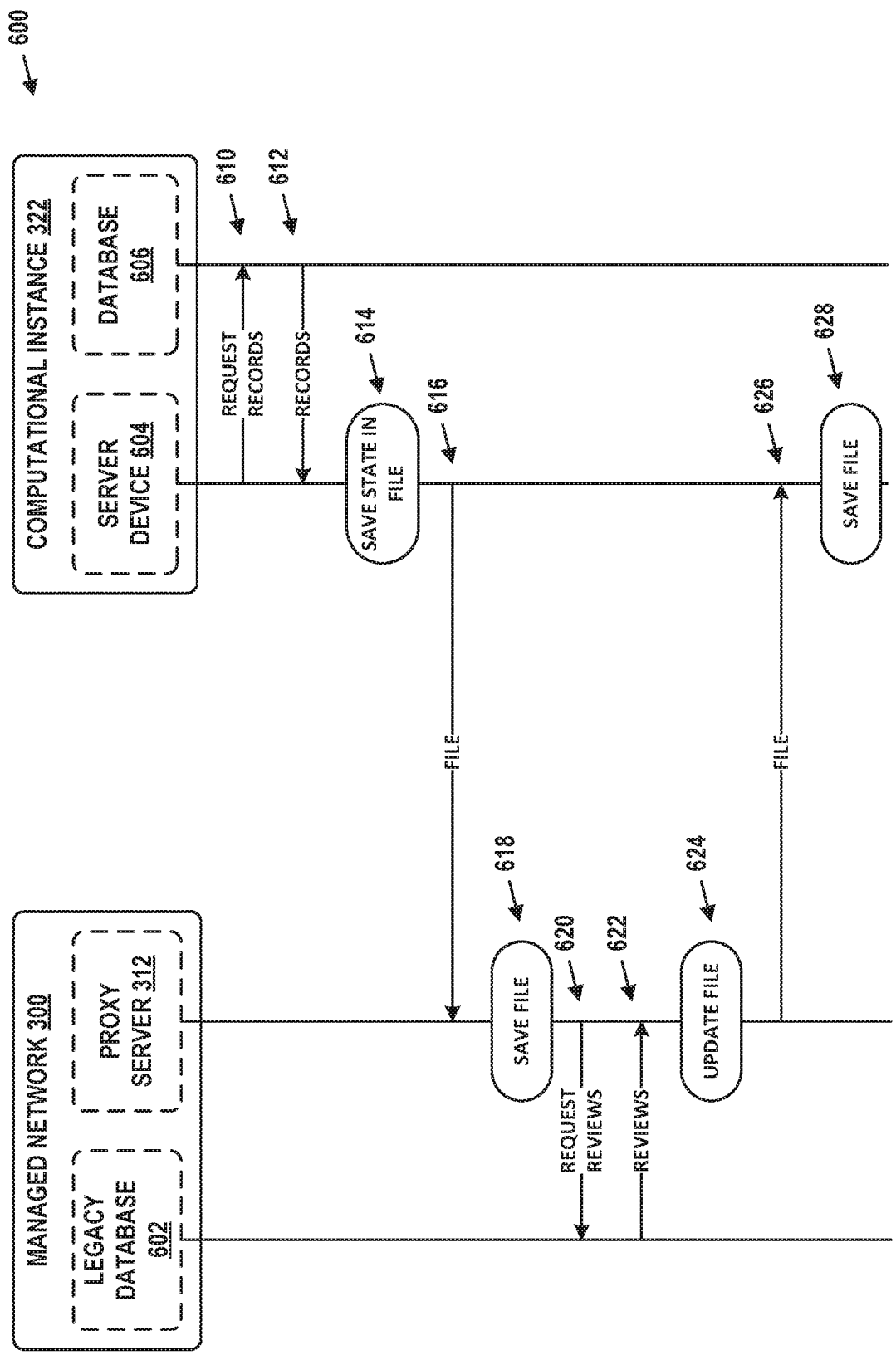
FIG. 6 is a message flow diagram, in accordance with example embodiments.

Such a workflow is depicted in FIG. 6. Message flow diagram 600 tracks communication between managed network 300 and computational instance 322 that carries out the workflow. Particularly, managed network 300 contains legacy database 602 and proxy server 312, while computational instance 322 contains server device 604 and database 606. At step 610, server device 604 requests employee records from database 606. At step 612, database 606 provides these records to server device 604. At step 614, server device 604 saves the workflow state in a file. At step 616, server device 604 transmits the file to proxy server 312. At step 618, proxy server 312 saves the file. At step 620, proxy server 312 requests review data for the employee records from legacy database 602. At step 622, legacy database 602 provides these reviews to proxy server 312. At step 624, proxy server 312 updates the save file (or replaces the existing file with a new file). At step 626, proxy server 312 transmits the file to server device 604. At step 628, server device 604 saves the file (which may involve overwriting the previous version of the file as saved).

These two example workflows are not exhaustive. Other workflows, both simpler and more complex, may exist. In some cases, workflows may invoke representational state transfer (REST) interfaces or remote command shell access to computing devices within the managed network or elsewhere.

Further, the workflows may be able to be designed visually by way of a GUI provided by the computational instance. For example, by way of the GUI, a user may be able to drag and drop icons representing common workflow operations into a flow chart representing the workflow. The user may also be able to add custom logic to these operations by way of the GUI. The resulting workflow definition may be compiled or otherwise transformed into an intermediate representation that can be executed by an underlying program or virtual machine. In some cases, the intermediate representation may be the structured file itself, or the intermediate representation may be able to be transformed into the structured file.

In any case, being able to represent the state of a workflow in a structured file has numerous benefits. It allows the execution of the workflow to be moved between the computational instance and the managed network, so that the workflow can obtain information that is only disposed on each of these systems. Additionally, it allows a workflow to be paused indefinitely. For example, a workflow may be designed to carry out some number of steps, and then pause for a supervisor's approval before continuing. This may require storing the state of the workflow for some number of hours or days while approval is sought.

Or, a workflow may carry out some steps, and then encounter an error in a subsequent step. Rather than fail completely and discard the progress made so far, the workflow may store its current state and request manual intervention (e.g., a password needed to access a service on the managed network). Again, this state may be stored for some number of hours or days until the intervention takes place.

As noted above, the state may be stored in a structured file, such as an XML or JSON file. While using a custom binary file format to store the state might be slightly more efficient, XML and JSON have the advantage of being widely supported by existing programming languages, and are in a human-readable form. The latter feature is especially helpful in debugging workflows. Given these factors, structured files are generally preferred over custom binary files.

Regardless of file format, modern enterprises are awash with data. Thus, in order to accurately represent a workflow state, the structured file may grow quite large. To that point, continuing with the employee record workflow example from above, an enterprise with 10,000 employees that executes this workflow may find itself with a structured file containing several tens of megabytes of state. Not only does this file take up an excessive amount of space when saved to long term storage (e.g., disk drive), but it also may stress the limitations of the workflow's runtime environment (e.g., a JAVA® virtual machine) and utilize an inordinate amount of network capacity when it is transferred between the computational instance and the managed network.

Thus, it is desirable to be able to reduce the size of structured files used to store workflow state. But doing so is non-trivial and conventional file compression techniques are insufficient for this task.

Notably, since the state represents a snapshot of the workflow's progress at some point in time, it represents all outputs received from and all inputs provided to steps carried out so far. In some scenarios, a single output may be provided as input to several subsequent steps. For example, the output of a REST query may be used as input to two different scripts (e.g., for parsing different data), as well as input to a logging mechanism. Thus, in this case, one output is used as input to three subsequent steps. And because the state is intended to be a complete representation of outputs provided by some steps and inputs provided to other steps, the output may be duplicated in the file once for each input. This duplication may be useful in situations where the workflow is paused after the output is received, but before it is used as input to further steps. By storing, in the file, a copy of the output as input to each of these steps, the workflow can continue from where it left off.

An example of this is shown in FIG. 7A using a truncated JSON file. The JSON objects shown in FIG. 7A include an output 700 and two inputs 702 and 704. The actual output value of output 700 is encoded in the "value" object, and consists of a string containing the characters "testValue1" repeated a number of times. The contents of this "value" object are also present in "value" objects for inputs 702 and 704. Further, the same content is also present in the "displayValue" object that appears in output 700 and inputs 702 and 704. Thus, the same output from a single step of the workflow is repeated six times in the JSON file.

Since the content of the value object in this example is relatively small for purposes of illustration, having six copies of it in the JSON file might not add significantly to the size of the JSON file. But, as noted above, some outputs can be several megabytes or larger. Thus, an output of 5 megabytes would result in 30 megabytes in this example, 25 megabytes of which is redundant.

The embodiments herein address this problem by introducing a compression mechanism through which a structured file can have one object refer back to another object therein. In this way, a large object can be represented only once in the structured file and then referred to by other objects. As a consequence, the size of the structured files can be reduced dramatically, often by an order of magnitude, resulting in less storage space and less network capacity utilization. While the embodiments herein are presented in using JSON files, in principle the embodiments could be used with XML, files or other types of structured files as well.

Conventional techniques have proven to be unable to address this specific issue. While generic file compression algorithms are usually effective at reducing the size of text-based files, the sliding dictionary of matches with which they operate is too small to recognize duplicate objects or strings of the size addressed herein. Thus, merely applying conventional file compression to a structured file with large chunks of duplicated content will be marginally effective at best.

FIG. 7B illustrates the JSON file of FIG. 7A, but with the duplicate output removed. In particular, the value object 710 is defined once as a compound object, and then subsequently referred to in additional compound objects 712, 714, and 716.

---

Encoding 1

```
"value":{
    "@class":"com.example.process_flow.engine.serialization.ValueProxy",
    "val":"testValue1testValue1testValue1testValue1testValue1testValue1
        testValue1testValue1testValue1testValue1testValue1testValue1test
        Value1testValue1testValue1testValue1testValue1testValue1testValue
        1testValue1testValue1testValue1testValue1testValue1testValue1test
        Value1testValue1testValue1testValue1testValue1",
    "key":"ff69712d-c60d-47d6-a2f1-79ce0c47f99d"
}
```
---

Notably, value object 710 is defined as shown in Encoding 1. The compound representation of value object 710 includes a class definition, val object, and key object. The class definition defines the compound object. The val object contains the actual value, which again is a number of repetitions of the string "testValue1" in this example. The key object defines a unique identifier for the compound object. The key object may be randomly determined without repetition, for example, and may be unique per the associated class definition or unique per file.

---

Encoding 2

```
"value":{
    "@class":"com.example.process_flow.engine.serialization.ValueProxy",
    "val": null,
    "key":"ff69712d-c60d-47d6-a2f1-79ce0c47f99d"
}
```
---

Once compound object 710 is defined in this fashion, it can be referred to or referenced at other points in the file. For example, the displayValue compound object 712 is now defined as shown in Encoding 2. Particularly, compound object 712 includes the same class and key objects as compound object 710, and a val object defined to be null. This null val object indicates that compound object 712 is a reference to a previously-defined compound object with the same class and key. Compound objects 714 and 716 are defined in a similar fashion.

Given these definitions, the following procedure can be used for storing the state of a workflow to memory when the workflow is paused, stops, or otherwise halts. When a string that is longer than a pre-determined size (e.g., 100, 200, 300, 500, or 1000 bytes, etc.) is initially written to the representation, it is encoded as a compound object. Thus, it is associated with a class and a unique key is generated for the string. When the same string needs to be represented again, a compound representation including the class and key are encoded along with a null value instead of another copy of the string.

Additionally, the following procedure can be used to decode the representation of the state. When the first instance of a compound object encoding a value is encountered while reading the file, the class, key, and the string are associated with one another in runtime memory (e.g., in a table, hash table, or map). Then, when another compound object encoding is found that contains a null value for the string, the class and/or key can be used as indexes to look up the actual value in runtime memory.

Here, it is assumed that all values can be encoded as strings. In the case of non-ASCII or non-displayable ASCII characters, various binary-to-ASCII schemes may be used (e.g., uuencoding or base64 encoding) to represent arbitrary values as text strings.

Figure 8:
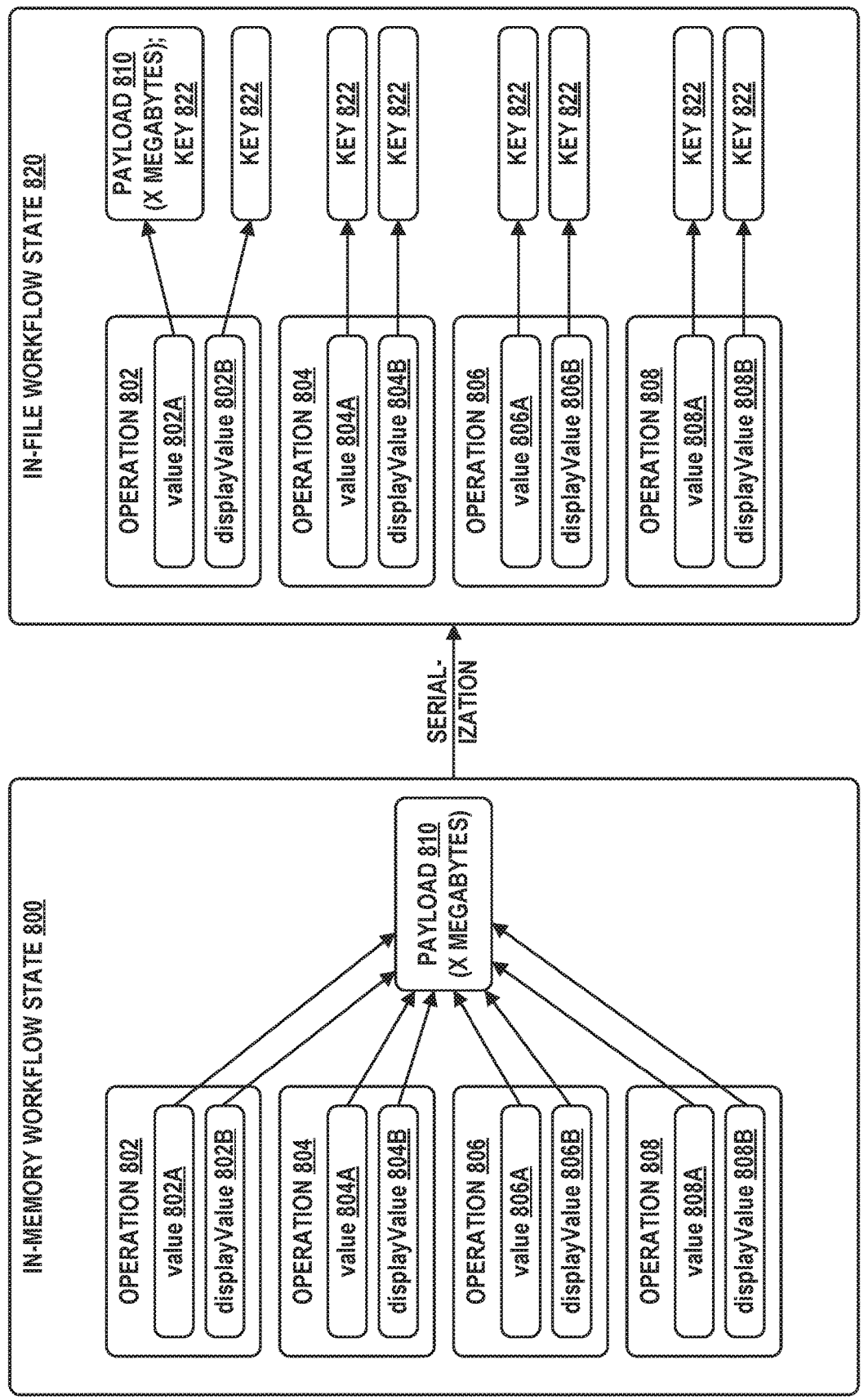
FIG. 8 depicts serialization of workflow state, in accordance with example embodiments.

FIG. 8 depicts the serialization process of converting an in-memory representation 800 of a workflow state to an in-file representation 820 of the workflow state. It is assumed that representation 800 is stored (temporarily at least) in volatile memory (e.g., main memory or RAM) while representation 820 is stored in non-volatile memory (e.g., long-term memory, such as a disk drive). But other implementations are possible.

Particularly, representation 800 includes operations 802, 804, 806, and 808. Each of these operations may represent an action taken by the workflow (e.g., a function call, execution of a command, execution of a module, etc.) that may be associated with input and/or output data. The data is referred to by a value object, such as value objects 802A, 804A, 806A, and 808A, respectively. Similar to the JSON files of FIGS. 7A and 7B, the operations may also be associated with displayValue objects 802B, 804B, 806B, and 808B, respectively. The displayValue objects may encode a representation of the value object that is human-readable and can be used for output or debugging purposes. In practice, the value and displayValue objects often contain the same data. The value objects and displayValue objects may contain additional information and/or metadata that is omitted from FIG. 8 for purposes of simplicity.

In representation 800, the data appears once, as payload 810. It is assumed, for sake of example, that payload 810 is X megabytes in size. Each of the value objects and display-Value objects contain a pointer or reference to payload 810, rather than their own copies of payload 810.

A naïve and conventional serialization technique might iterate through the operations of representation 800, writing each to a file in order. Thus, operation 802 (including representations of value 802A and displayValue 802B) may be written to the file, then operation 804 (including representations of value 804A and displayValue 804B) may be written to the file, and so on. This would result in a total of 8 representations of payload 810 being present in the file, requiring a total of 8X megabytes of storage in addition to other data representing the operations that are also stored in the file.

In order to avoid this duplication of data when serializing the workflow state to a file, the compression techniques described herein may be used. As discussed above, this results in only one copy of certain parts of the data (e.g., payload 810) being stored. In particular, representation 820 also includes operations 802, 804, 806, and 808. But instead of storing a copy of payload 810 for each value object and displayValue object, one copy of payload 810 appears in the file and is associated with key 822. Afterward, each value object and displayValue object that refers to payload 810 contains a copy of key 822 instead. Since the representation of key 822 may be a relatively small number of bytes (e.g., 16, 32, 64, etc.), representation 820 results in a storage space savings of approximately 7X megabytes.

In some embodiments, a size threshold may be used to determine whether to naively copy the data in an object into representation 820 or to encode this data using compression as described herein. Notably, there is a small overhead with formulating data into a compound object—the representation of the key and possibly other information. But this overhead is expected to be at most a few hundred bytes, usually less.

Therefore, the embodiments might only use compression for data that is more than 100, 200, 300, 500, or 1000 bytes for example. Other thresholds are possible. If the data is not larger than this threshold, it may be stored in an uncompressed fashion, even if that results in multiple copies of the data being present in the file. The threshold may be user-specified and/or user-adjustable.

Figure 9:
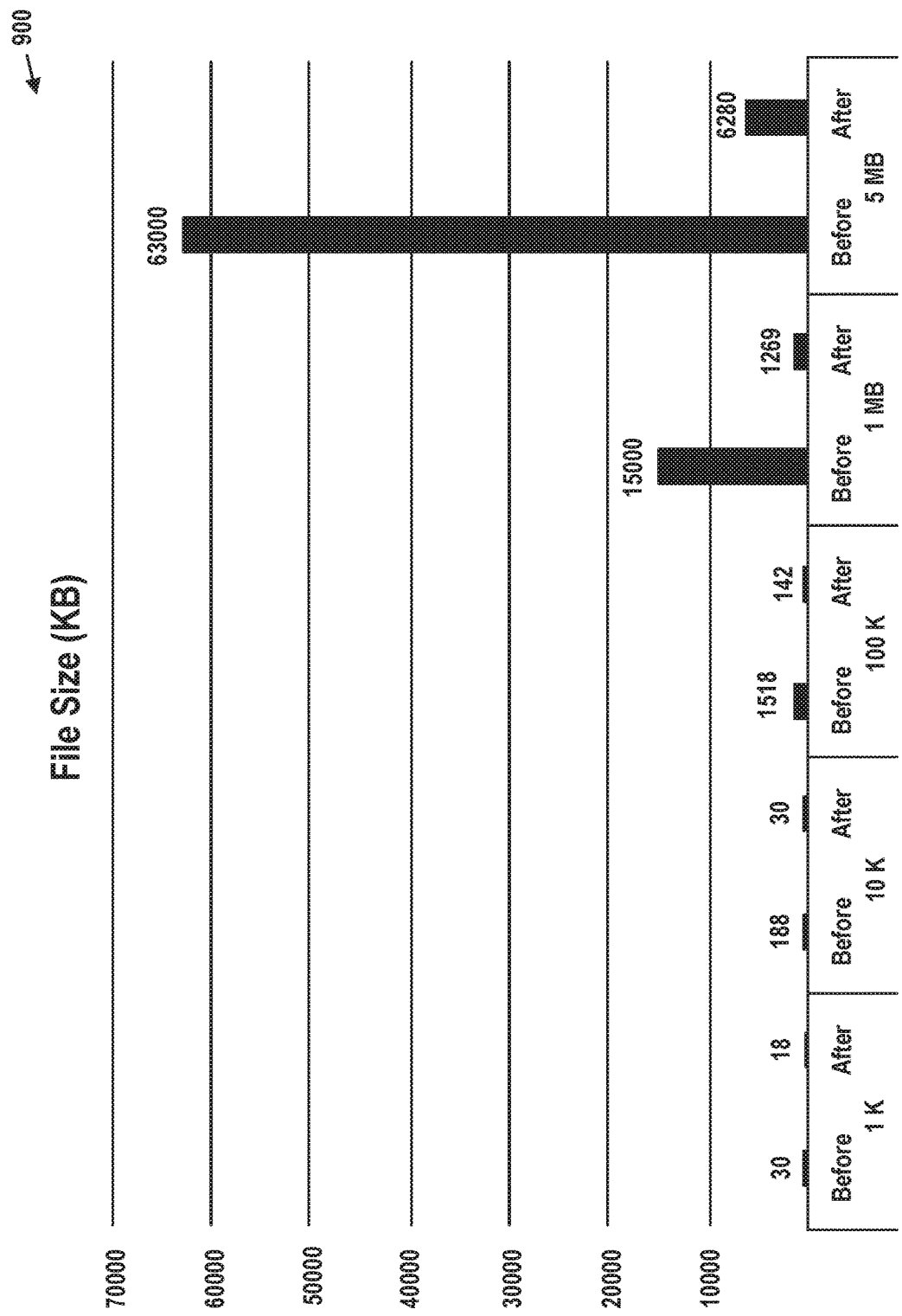
FIG. 9 depicts a chart demonstrating storage improvements due to compression during workflow serialization, in accordance with example embodiments.

FIG. 9 depicts a chart 900 of file sizes, in kilobytes, of files that were created with and without using the compression techniques described herein. On the x-axis, before and after file sizes of files that contain multiple copies of objects of various sizes are plotted. For example, a file containing a repeated object with a size of 1 kilobyte would be 30 kilobytes without using the compression techniques herein, but would be only 18 kilobytes using these compression techniques.

In these files, the objects were repeated 12 times. In practice, this is a representative multiple. Even a simple workflow can result in this level of duplication as one operation's outputs are mapped to other operations' inputs.

The improvements increase dramatically with the size of the repeated object. For example, a file containing a repeated object with a size of 100 kilobytes would be 1518 kilobytes without using the compression techniques herein, but would be only 142 kilobytes using these compression techniques. Likewise, a file containing a repeated object with a size of 5 megabytes would be 63 megabytes without using the compression techniques herein, but would be only 6.28 megabytes using these compression techniques.

VI. EXAMPLE OPERATIONS

Figure 10:
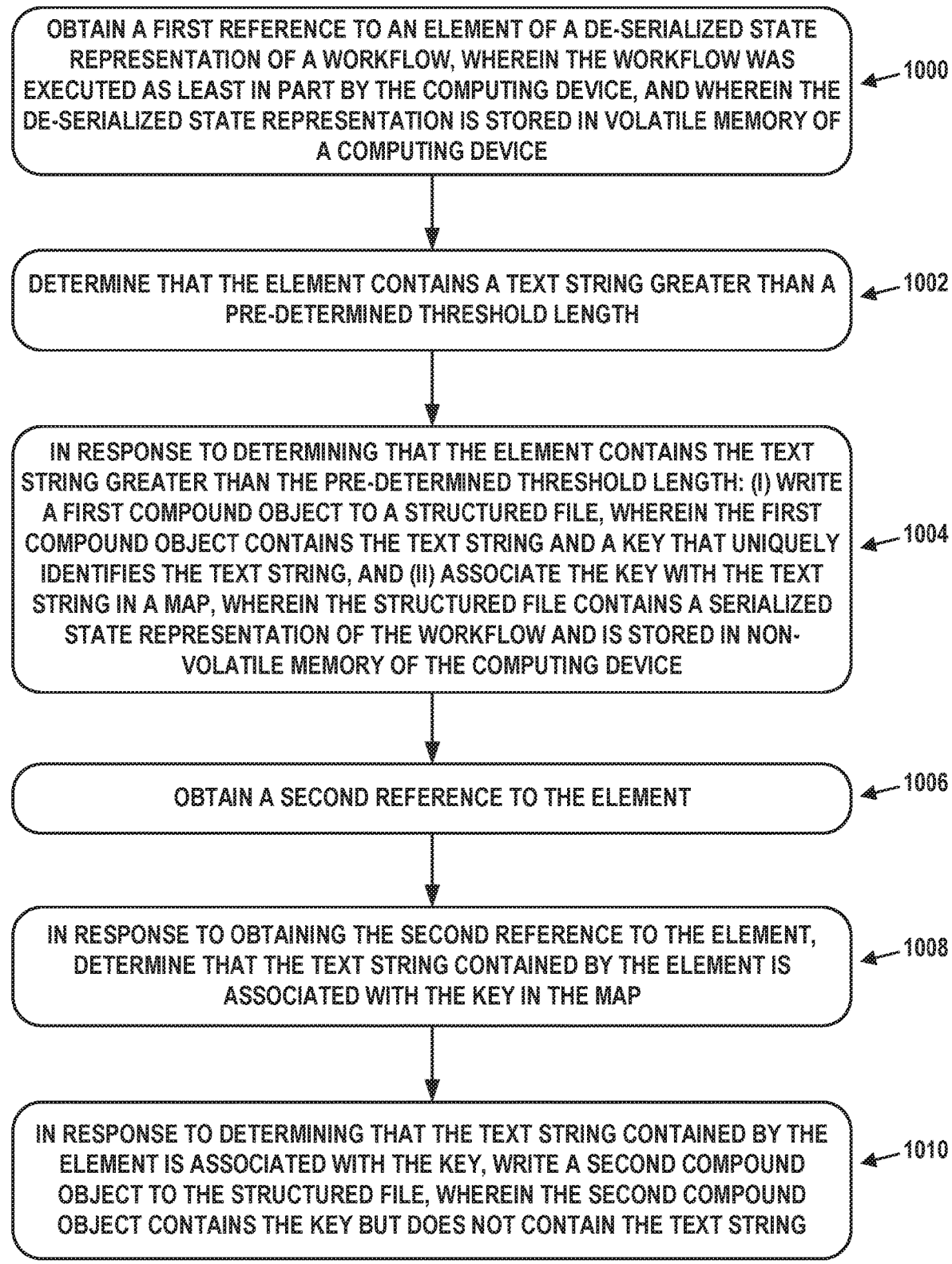
FIG. 10 is a flow chart, in accordance with example embodiments.
Figure 11:
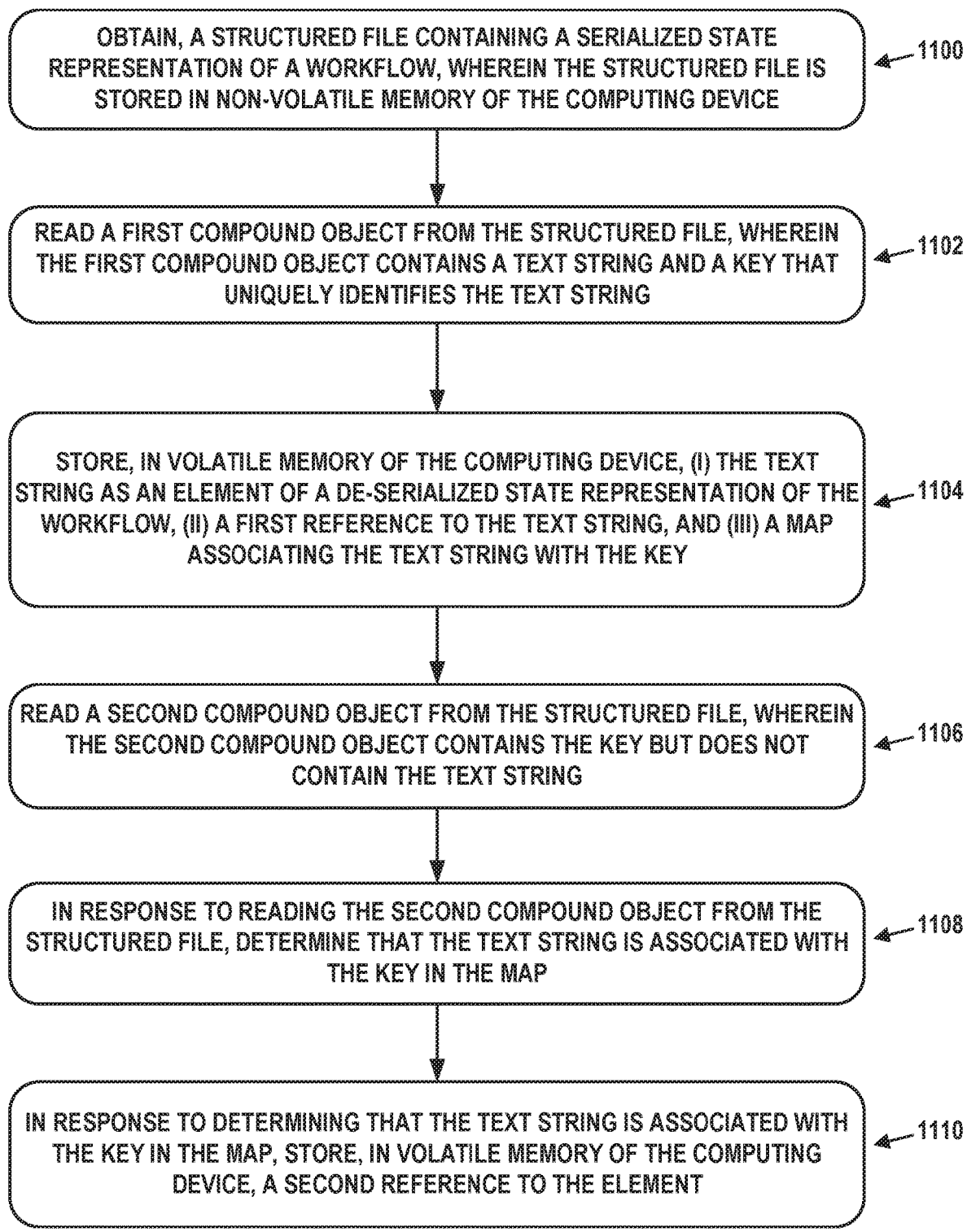
FIG. 11 is a flow chart, in accordance with example embodiments.

FIGS. 10 and 11 are flow charts illustrating example embodiments. The processes illustrated by FIGS. 10 and 11 may be carried out by a computing device, such as computing device 100, and/or a cluster of computing devices, such as server cluster 200. However, the process can be carried out by other types of devices or device subsystems. For example, the processes could be carried out at least in part by a portable computer, such as a laptop or a tablet device.

The embodiments of FIGS. 10 and 11 may be simplified by the removal of any one or more of the features shown therein. Further, these embodiments may be combined with features, aspects, and/or implementations of any of the previous figures or otherwise described herein.

Block 1000 of FIG. 10 may involve obtaining a first reference to an element of a de-serialized state representation of a workflow, where the workflow was executed as least in part by the computing device, and where the de-serialized state representation is stored in volatile memory of a computing device.

Block 1002 may involve determining that the element contains a text string greater than a pre-determined threshold length.

Block 1004 may involve, possibly in response to determining that the element contains the text string greater than the pre-determined threshold length: (i) writing a first compound object to a structured file, where the first compound object contains the text string and a key that uniquely identifies the text string, and (ii) associating the key with the text string in a map, where the structured file contains a serialized state representation of the workflow and is stored in non-volatile memory of the computing device.

Block 1006 may involve obtaining a second reference to the element.

Block 1008 may involve, possibly in response to obtaining the second reference to the element, determining that the text string contained by the element is associated with the key in the map.

Block 1010 may involve, possibly in response to determining that the text string contained by the element is associated with the key, writing a second compound object to the structured file, where the second compound object contains the key but does not contain the text string.

In some embodiments, the second compound object contains a null value as a substitution for the text string.

In some embodiments, the structured file is a JSON file or an XML file.

Some embodiments may further involve: (i) obtaining a third reference to the element; (ii) possibly in response to obtaining the third reference to the element, determining that the text string contained by the element is associated with the key in the map; and (iii) possibly in response to determining that the text string contained by the element is associated with the key, writing a third compound object to the structured file, where the third compound object contains the key but does not contain the text string.

Some embodiments may further involve: (i) obtaining a third reference to a second element of the de-serialized state representation; (ii) determining that the second element contains a second text string greater than the pre-determined threshold length; and (iii) possibly in response to determining that the second element contains the second text string greater than the pre-determined threshold length, (a) writing a third compound object to the structured file, where the third compound object contains the second text string and a second key that uniquely identifies the second text string, and (b) associating the second key with the second text string in the map; (iv) obtaining a fourth reference to the second element; (v) possibly in response to obtaining the fourth reference to the second element, determining that the second text string contained by the second element is associated with the second key in the map; and (vi) possibly in response to determining that the second text string contained by the second element is associated with the second key, writing a fourth compound object to the structured file, where the fourth compound object contains the second key but does not contain the second text string.

Some embodiments may further involve: (i) obtaining a third reference to a second element of the de-serialized state representation; (ii) determine that the second element contains a second text string that is not greater than the pre-determined threshold length; and (iii) possibly in response to determining that the second element contains the second text string that is not greater than the pre-determined threshold length, write the second text string in its entirety to the structured file.

In some embodiments, the first reference represents output of a first action of the workflow, and the second reference represents input to a second action of the workflow, where the workflow specifies that the second action takes place after the first action.

In some embodiments, the computing device is disposed within a computational instance of a remote network management platform, and the computational instance is associated with a managed network. These embodiments may further involve transmitting, to a proxy server application disposed within the managed network, the structured file, where the proxy server application uses the structured file to further execute the workflow.

Additionally, these embodiments may involve: (i) obtaining, by the proxy server application, the structured file; (ii) reading, by the proxy server application, the first compound object from the structured file; (iii) storing, by the proxy server application and in volatile memory accessible to the proxy server application (a) the text string as a reconstructed element of the de-serialized state representation, and (b) a first reference to the text string; (iv) storing, by the proxy server application and in volatile memory accessible to the proxy server application, a reconstructed map associating the text string with the key; (v) reading, by the proxy server application, the second compound object from the structured file; (vi) possibly in response to reading the second compound object from the structured file, determining, by the proxy server application, that the text string is associated with the key in the reconstructed map; and, (vii) possibly in response to determining that the text string is associated with the key in the reconstructed map, storing, by the proxy server application and in volatile memory accessible to the proxy server application, a second reference to the element.

Block 1100 of FIG. 11 may involve obtaining a structured file containing a serialized state representation of a workflow, where the structured file is stored in non-volatile memory of a computing device.

Block 1102 may involve reading a first compound object from the structured file, where the first compound object contains a text string and a key that uniquely identifies the text string.

Block 1104 may involve storing, in volatile memory of the computing device, (i) the text string as an element of a de-serialized state representation of the workflow, (ii) a first reference to the text string, and (iii) a map associating the text string with the key.

Block 1106 may involve reading a second compound object from the structured file, where the second compound object contains the key but does not contain the text string.

Block 1108 may involve, possibly in response to reading the second compound object from the structured file, determining that the text string is associated with the key in the map.

Block 1110 may involve, possibly in response to determining that the text string is associated with the key in the map, storing, in volatile memory of the computing device, a second reference to the element.

In some embodiments, the first reference represents output of a first action of the workflow, and the second reference represents input to a second action of the workflow, where the workflow specifies that the second action takes place after the first action.

The embodiments of FIG. 11 may further include any of the features discussed in the context of FIG. 10.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
    a computational instance of a remote network management platform, wherein a computing device is disposed within the computational instance and is associated with a managed network; and
    a proxy server application, executable on a server device that is disposed within the managed network;
    wherein the computing device is configured to:
    receive, from volatile memory of the computing device, a de-serialized state representation of a workflow that was executed at least in part by the computational instance, wherein the de-serialized state representation comprises one or more elements that include a text string greater than a pre-determined threshold length;
    determine that a first element of the de-serialized state representation includes a first text string that is greater than the pre-determined threshold length;
    in response to determining that the first element of the de-serialized state representation includes the first text string that is greater than the pre-determined threshold length, (i) write a first compound object to a serialized state representation of the workflow in a structured file stored in non-volatile memory of the computing device, wherein the first compound object includes the first text string and a key that uniquely identifies the first text string, and (ii) associate the key with the first text string in a map stored in the non-volatile memory of the computing device;
    determine that a second element of the de-serialized state representation includes a second text string associated with the key based on the map;
    in response to determining that the second element of the de-serialized state representation includes the second text string associated with the key based on the map, write a second compound object to the serialized state representation of the workflow in the structured file stored in the non-volatile memory of the computing device, wherein the second compound object includes the key but does not include the second text string; and
    transmit, from the non-volatile memory of the computing device to the proxy server application, the structured file, wherein the proxy server application uses the structured file to further execute the workflow.

2. The computing system of claim 1, wherein the second compound object contains a null value as a substitution for the second text string.

3. The computing system of claim 1, wherein the structured file is a JavaScript Object Notation (JSON) file or an eXtensible Markup Language (XML) file.

4. The computing system of claim 1, wherein the computing device is configured to:
    determine that a third element of the de-serialized state representation includes a third text string associated with the key based on the map;
    and
    in response to determining that the third element includes the third text string associated with the key, write a third compound object to the serialized state representation of the workflow in the structured file stored in the non-volatile memory of the computing device, wherein the third compound object includes the key but does not include the third text string.

5. The computing system of claim 1, wherein the computing device is configured to:
   determine that the second element of the de-serialized state representation includes a third text string that is greater than the pre-determined threshold length;
   in response to determining that the second element includes the third text string that is greater than the pre-determined threshold length, (i) write a third compound object to the serialized state representation of the workflow in the structured file stored in the non-volatile memory of the computing device, wherein the third compound object includes the third text string and a second key that uniquely identifies the third text string, and (ii) associate the second key with the third text string in the map;
   determine that a third element of the de-serialized state representation includes a fourth text string associated with the second key in the map; and
   in response to determining that the third element of the de-serialized state representation includes the fourth text string associated with the second key, write a fourth compound object to the serialized state representation of the workflow the structured file stored in the non-volatile memory of the computing device, wherein the fourth compound object includes the second key but does not include the fourth text string.

6. The computing system of claim 1, wherein the computing device is configured to:
   determine that the second element of the de-serialized state representation includes a third text string that is not greater than the pre-determined threshold length; and
   in response to determining that the second element includes the third text string that is not greater than the pre-determined threshold length, write the third text string in its entirety to the serialized state representation of the workflow in the structured file stored in the non-volatile memory of the computing device.

7. The computing system of claim 1, wherein the first element represents output of a first action of the workflow, wherein the second element represents input to a second action of the workflow, and wherein the workflow specifies that the second action takes place after the first action.

8. The computing system of claim 1, wherein the server device, via the proxy server application, is configured to:
   receive, from the computing device, the structured file including the serialized state representation of the workflow;
   read the first compound object from the serialized state representation of the workflow in the structured file;
   store, in second volatile memory accessible to the proxy server application, (i) the first text string as a reconstructed element of the de-serialized state representation, (ii) a first reference to the first text string, and (iii) a reconstructed map associating the first text string with the key;
   read the second compound object from the serialized state representation of the workflow in the structured file;
   in response to reading the second compound object from the serialized state representation of the workflow in the structured file, determine that the second text string is associated with the key in the reconstructed map; and
   in response to determining that the second text string is associated with the key in the reconstructed map, store, in the second volatile memory, a second reference to the second text string.

9. A computer-implemented method, comprising:
   receiving, by a computing device from volatile memory of the computing device, a de-serialized state representation of a workflow that was executed at least in part by a computational instance, wherein the de-serialized state representation comprises one or more elements that include a text string greater than a pre-determined threshold length;
   determining, by the computing device, that a first element of the de-serialized state representation includes a first text string that is greater than the pre-determined threshold length;
   in response to determining that the first element of the de-serialized state representation includes the first text string that is greater than the pre-determined threshold length, (i) writing, by the computing device, a first compound object to a serialized state representation of the workflow in a structured file stored in non-volatile memory of the computing device, wherein the first compound object includes the first text string and a key that uniquely identifies the first text string, and (ii) associating the key with the first text string in a map stored in the non-volatile memory of the computing device;
   determining, by the computing device, that a second element of the de-serialized state representation includes a second text string associated with the key based on the map; and
   in response to determining that the second element of the de-serialized state representation includes the second text string associated with the key based on the map, writing, by the computing device, a second compound object to the serialized state representation of the workflow in the structured file stored in the non-volatile memory of the computing device, wherein the second compound object includes the key but does not include the second text string.

10. The computer-implemented method of claim 9, wherein the second compound object contains a null value as a substitution for the second text string.

11. The computer-implemented method of claim 9, comprising:
   determining, by the computing device, that a third element of the de-serialized state representation includes a third text string associated with the key based on the map; and
   in response to determining that the third element includes the third text string associated with the key, writing, by the computing device, a third compound object to the serialized state representation of the workflow in the structured file stored in the non-volatile memory of the computing device, wherein the third compound object includes the key but does not include the third text string.

12. The computer-implemented method of claim 9, comprising:
   determining, by the computing device, that the second element of the de-serialized state representation includes a third text string that is greater than the pre-determined threshold length;
   in response to determining that the second element includes the third text string that is greater than the pre-determined threshold length, (i) writing, by the computing device, a third compound object to the serialized state representation of the workflow in the structured file stored in the non-volatile memory of the computing device, wherein the third compound object includes the third text string and a second key that uniquely identifies the third text string, and (ii) associating, by the computing device, the second key with the third text string in the map;

determine that a third element of the de-serialized state representation includes a fourth text string associated with the second key in the map; and in response to determining that the third element of the de-serialized state representation includes the fourth text string associated with the second key, writing, by the computing device, a fourth compound object to the serialized state representation of the workflow the structured file stored in the non-volatile memory of the computing device, wherein the fourth compound object includes the second key but does not include the fourth text string.

13. The computer-implemented method of claim 9, wherein the first element represents output of a first action of the workflow, wherein the second element represents input to a second action of the workflow, and wherein the workflow specifies that the second action takes place after the first action.

14. The computer-implemented method of claim 9, wherein the computing device is disposed within a computational instance of a remote network management platform, and wherein the computational instance is associated with a managed network, the method comprising:

transmitting, by the computing device, to a proxy server application that is executable on a server device disposed within the managed network, the structured file, wherein the proxy server application uses the structured file to further execute the workflow.

15. The computer-implemented method of claim 14, comprising:

receiving, by the server device via the proxy server application, the structured file including the serialized state representation of the workflow from the computing device;

reading, by the server device via the proxy server application, the first compound object from the serialized state representation of the workflow in the structured file;

storing, by the server device via the proxy server application and in second volatile memory accessible to the proxy server application, (i) the first text string as a reconstructed element of the de-serialized state representation, (ii) a first reference to the first text string, and (iii) a reconstructed map associating the first text string with the key;

reading, by the server device via the proxy server application, the second compound object from the serialized state representation of the workflow in the structured file;

in response to reading the second compound object from the serialized state representation of the workflow in the structured file, determining, by the server device via the proxy server application, that the second text string is associated with the key in the reconstructed map; and in response to determining that the second text string is associated with the key in the reconstructed map, storing, by the server device via the proxy server application and in the second volatile memory, a second reference to the second text string.

16. The computer-implemented method of claim 9, wherein the structured file is a JavaScript Object Notation (JSON) file or an eXtensible Markup Language (XML) file.

17. A computer-implemented method comprising:

obtaining, by a computing device, a structured file containing a serialized state representation of a workflow, wherein the structured file is stored in non-volatile memory of the computing device;

reading, by the computing device, a first compound object from the structured file, wherein the first compound object contains a text string and a key that uniquely identifies the text string;

storing, by the computing device and in volatile memory of the computing device, (i) the text string as an element of a de-serialized state representation of the workflow, (ii) a first reference to the text string, and (iii) a map associating the text string with the key;

reading, by the computing device, a second compound object from the structured file, wherein the second compound object contains the key but does not contain the text string;

in response to reading the second compound object from the structured file, determining, by the computing device, that the text string is associated with the key in the map; and in response to determining that the text string is associated with the key in the map, storing, by the computing device and in volatile memory of the computing device, a second reference to the element.

18. The computer-implemented method of claim 17, wherein the first reference represents output of a first action of the workflow, and wherein the second reference represents input to a second action of the workflow, wherein the workflow specifies that the second action takes place after the first action.

19. The computer-implemented method of claim 17, wherein the structured file is a JavaScript Object Notation (JSON) file or an eXtensible Markup Language (XML) file.

20. The computer-implemented method of claim 17, wherein the computing device is a server device that is disposed within a managed network, and wherein the server device receives the structured file from a computational instance of a remote network management platform that is associated with the managed network.

* * * * *